US012651276B2

(12) United States Patent
Shergill et al.

(10) Patent No.: US 12,651,276 B2
(45) Date of Patent: **\*Jun. 9, 2026**

(54) SYSTEM AND METHOD FOR MONITORING AND TRACKING USER ACTIVITIES

(71) Applicant: Capital One Services, LLC, McLean, VA (US)

(72) Inventors: Jaidev Shergill, Amagansett, NY (US); Michele Serro, Palm Beach Gardens, FL (US); Shiv Bir Singh, New York, NY (US)

(73) Assignee: CAPITAL ONE SERVICES, LLP, McLean, VA (US)

( \* ) Notice: Subject to any disclaimer, the term of this patent is extended or adjusted under 35 U.S.C. 154(b) by 486 days.

This patent is subject to a terminal disclaimer.

(21) Appl. No.: 17/734,716

(22) Filed: May 2, 2022

(65) Prior Publication Data

US 2022/0261838 A1 Aug. 18, 2022

Related U.S. Application Data

(63) Continuation of application No. 12/951,752, filed on Nov. 22, 2010, now Pat. No. 11,321,727.

(51) Int. Cl.
*G06Q 30/0217* (2023.01)
*G06Q 20/10* (2012.01)

(52) U.S. Cl.
CPC ......... *G06Q 30/0217* (2013.01); *G06Q 20/10* (2013.01)

(58) Field of Classification Search
CPC .......................... G06Q 30/0217; G06Q 20/10
See application file for complete search history.

(56) References Cited

U.S. PATENT DOCUMENTS

| | | | |
|---|---|---|---|
| 5,221,838 A | 6/1993 | Gutman et al. | |
| 5,710,887 A | 1/1998 | Chelliah et al. | |
| 6,018,768 A * | 1/2000 | Ullman | H04N 21/4782 |
| | | | 348/E7.071 |
| 6,081,750 A * | 6/2000 | Hoffberg | G06F 9/453 |
| | | | 700/86 |

(Continued)

FOREIGN PATENT DOCUMENTS

| | | | | |
|---|---|---|---|---|
| EP | 1356438 B1 * | 6/2014 | ............. | G06Q 40/03 |
| GB | 2375608 A | 11/2002 | | |

(Continued)

*Primary Examiner* — Daniel S Felten

(74) *Attorney, Agent, or Firm* — TROUTMAN PEPPER LOCKE LLP; Christopher J. Forstner; John A. Morrissett

(57) ABSTRACT

The disclosed embodiments assist a user in monitoring one or more user-selected activities. In addition, a user may share the monitored information with one or more people, such as a particular group of friends (e.g., friends associated with a social networking website) or by e-mailing or text messaging the monitored information to a particular person or persons. In some embodiments, a user may participate in a competition with one or more people (e.g., designated friends or even random people) to either perform or not perform a particular activity. Still, in some embodiments, the disclosed embodiments may automatically receive financial data from a financial service provider and update/display one or more user-selected activities based on the received financial data.

20 Claims, 5 Drawing Sheets

(56) References Cited

U.S. PATENT DOCUMENTS

| | | | |
|---|---|---|---|
| 7,240,036 B1 | 7/2007 | Mamdani et al. | |
| 7,590,569 B2 | 9/2009 | Lai et al. | |
| 7,717,827 B2 | 5/2010 | Kurunmaki et al. | |
| 7,811,201 B1 | 10/2010 | Mikan et al. | |
| 7,930,249 B2 | 4/2011 | Roberts | |
| 7,997,476 B2 | 8/2011 | Gannon | |
| 8,099,316 B2 | 1/2012 | Moukas et al. | |
| 8,190,521 B2 * | 5/2012 | O'Leary | G06Q 30/0222 |
| | | | 705/35 |
| 8,359,268 B2 * | 1/2013 | Blythe | G06Q 20/04 |
| | | | 705/40 |
| 8,527,347 B2 | 9/2013 | Pulijala et al. | |
| 8,566,197 B2 * | 10/2013 | Satyavolu | H04M 15/00 |
| | | | 705/14.1 |
| 8,650,105 B2 * | 2/2014 | Satyavolu | G06Q 40/00 |
| | | | 705/40 |
| 8,874,639 B2 | 10/2014 | Lindsay et al. | |
| 8,925,802 B1 * | 1/2015 | Pletz | G06Q 40/00 |
| | | | 705/37 |
| 8,930,265 B2 * | 1/2015 | Blackhurst | G06Q 20/10 |
| | | | 705/35 |
| 8,990,103 B2 | 3/2015 | Priyadarshan et al. | |
| 8,996,402 B2 | 3/2015 | Priyadarshan et al. | |
| 9,275,407 B2 | 3/2016 | McLaughlin et al. | |
| 9,911,114 B2 | 3/2018 | Rackley, III et al. | |
| 9,992,119 B2 | 6/2018 | Dunmire et al. | |
| 9,996,826 B2 | 6/2018 | Levchin et al. | |
| 10,019,711 B1 * | 7/2018 | Lerner | G06Q 20/40 |
| 10,332,202 B2 * | 6/2019 | Watson | G06Q 10/00 |
| 10,445,750 B2 * | 10/2019 | Chen | G06Q 30/02 |
| 10,482,467 B1 * | 11/2019 | Samitt | G06Q 20/407 |
| 10,719,876 B2 * | 7/2020 | Shakkarwar | G06Q 20/102 |
| 10,810,660 B1 * | 10/2020 | Diggdon | G06Q 20/227 |
| 10,817,880 B2 * | 10/2020 | Nicholson | G06Q 20/42 |
| 10,917,458 B2 | 2/2021 | Lazu | |
| 11,010,555 B2 | 5/2021 | Terry et al. | |
| 11,100,285 B2 | 8/2021 | Terry et al. | |
| 11,348,034 B1 * | 5/2022 | Jain | G06N 5/01 |
| 11,348,133 B2 * | 5/2022 | Tucker | G06Q 40/06 |
| 2003/0046201 A1 | 3/2003 | Cheyer | |
| 2006/0031840 A1 * | 2/2006 | Yigit | G06F 9/5088 |
| | | | 718/102 |
| 2007/0061363 A1 | 3/2007 | Ramer et al. | |
| 2007/0088851 A1 | 4/2007 | Levkovitz et al. | |
| 2007/0088852 A1 | 4/2007 | Levkovitz | |
| 2008/0208690 A1 | 8/2008 | Lim | |
| 2009/0069156 A1 | 3/2009 | Kurunmaki et al. | |
| 2010/0292050 A1 | 11/2010 | DiBenedetto | |
| 2011/0010253 A1 * | 1/2011 | Chenot | G07F 7/08 |
| | | | 705/17 |
| 2011/0066488 A1 | 3/2011 | Ludewig et al. | |
| 2011/0136627 A1 | 6/2011 | Williams | |
| 2011/0177847 A1 | 7/2011 | Huang | |
| 2011/0179078 A1 | 7/2011 | Boerries et al. | |
| 2011/0184936 A1 | 7/2011 | Lymberopoulos et al. | |
| 2011/0185202 A1 | 7/2011 | Black et al. | |
| 2011/0196782 A1 * | 8/2011 | Allen | G06Q 20/10 |
| | | | 705/39 |
| 2011/0202969 A1 * | 8/2011 | Warn | H04L 63/102 |
| | | | 726/4 |
| 2011/0225417 A1 | 9/2011 | Maharajh et al. | |
| 2011/0231223 A1 | 9/2011 | Winters | |
| 2011/0246280 A1 * | 10/2011 | Satyavolu | G06Q 30/0255 |
| | | | 705/14.27 |
| 2014/0032294 A1 * | 1/2014 | Donlan | G06Q 30/0224 |
| | | | 705/14.17 |
| 2014/0143109 A1 * | 5/2014 | Satyavolu | G06Q 30/0215 |
| | | | 705/35 |
| 2014/0214666 A1 | 7/2014 | Isaacson et al. | |
| 2015/0248669 A1 * | 9/2015 | Kornman | G06Q 20/10 |
| | | | 705/41 |
| 2016/0034863 A1 | 2/2016 | Ross | |
| 2016/0063072 A1 * | 3/2016 | N | G06F 16/248 |
| | | | 707/722 |
| 2016/0063455 A1 * | 3/2016 | Russell | G06Q 20/204 |
| | | | 705/16 |
| 2016/0267601 A1 | 9/2016 | Kundu | |
| 2017/0357992 A1 * | 12/2017 | Yang | G06Q 40/03 |
| 2018/0096377 A1 * | 4/2018 | Benjamin | G06Q 30/0238 |
| 2021/0081920 A1 * | 3/2021 | Spina | G06N 20/00 |
| 2021/0090078 A1 * | 3/2021 | Bozicevich | G06Q 20/4016 |
| 2021/0090145 A1 * | 3/2021 | David | G06Q 30/0611 |
| 2022/0210742 A1 * | 6/2022 | Nirantar | H04L 41/0833 |
| 2024/0348634 A1 * | 10/2024 | De Jesus | H04L 63/1425 |

FOREIGN PATENT DOCUMENTS

| | | | |
|---|---|---|---|
| JP | 2016174394 A | 9/2016 | |
| WO | WO-2007038582 A1 * | 4/2007 | G06F 9/542 |

* cited by examiner

100

102

102

320

SYSTEM AND METHOD FOR MONITORING AND TRACKING USER ACTIVITIES

CROSS REFERENCE TO RELATED APPLICATIONS

This application is a continuation of, and claims priority under 35 U.S.C. § 120 to, U.S. patent application Ser. No. 12/951,752, filed Nov. 22, 2010, the entire contents of which are fully incorporated herein by reference.

FIELD OF THE INVENTION

The present invention relates generally to the field of applications for computing devices, such as mobile phones, personal digital assistants, personal computers, laptops, portable media players and the like, and more particularly to a system and method for tracking user activities.

BACKGROUND

With the proliferation of computing devices, especially mobile devices, such as smart phones, people are able to receive and share information in almost real-time fashion. In addition, smart phones have created a whole new industry for software developers to create applications that run on these mobile devices such as, but not limited to, an iPhone® apps, or applications, which are third-party software programs developed specifically for the iPhone® and the iPod Touch®. The applications can be downloaded directly by the mobile device, or downloaded to a computer and transferred to the mobile device. For example, Apple® has an iPhone® app store for those who want to add new features to their iPhone®. Other mobile device providers also provide app stores in which applications may be downloaded and added to their particular mobile device.

SUMMARY OF THE INVENTION

The disclosed embodiments include a system and method for self-monitoring one or more user activities and for sharing the monitored information associated with others. For example, in one embodiment, a method is disclosed for tracking and reporting activities of at least one participant in a competition. The method includes receiving a first input from a first participant relating to a first activity of a first activity type performed by the first participant. The method processes the first input using a processor and data stored in memory relating to the first activity type. The method displays a first status output to the first participant on the display device based on the first activity, the first activity type data, and a predetermined goal. The predetermined goal is set by at least one of the first participant or automatically.

In another embodiment, a system is disclosed for tracking and reporting activities of at least one participant in a competition. The system includes a processor, memory coupled to the processor, and an input device coupled to the processor. The input device is used to obtain information from a first participant relating to a first activity of a first activity type performed by the first participant. The processor processes the information using data stored in memory relating to the first activity type to obtain a first status output based on the first activity, the first activity type data, and a predetermined goal. The predetermined goal is set by at least one of the first participant or automatically. The system further includes a display coupled to the processor. The display is used to display the first status output.

Still, in another embodiment, a computer program product to be used with a processor is disclosed. The computer program product comprises a computer usable medium having computer readable program code embodied therein to be used when tracking and reporting activities of at least one participant in a competition. The computer readable program code includes computer readable program code to be used when receiving a first input from a first participant relating to a first activity of a first activity type performed by the first participant. The computer readable program code also includes code to be used when processing the first input using the processor and data stored in memory relating to the first activity type and to display a first status output to the first participant on a display device based on the first activity, the first activity type data, and a predetermined goal, wherein the predetermined goal is set by at least one of the first participant or automatically.

BRIEF DESCRIPTION OF THE DIAGRAMS

DETAILED DESCRIPTION

The disclosed embodiments may assist a user in monitoring his or her activities, e.g., spending, whether for health reasons, financial reasons, entertainment, some other reason or for any combination of the above. In addition, a user may share or choose to share the monitored information with one or more people, such as a particular group of friends (e.g., friends associated with a social networking website) or by e-mailing or text messaging the monitored information to a particular person or persons. In some embodiments, a user may participate in a competition with one or more people (e.g., designated friends or even random people) to either perform or not perform a particular activity. In these embodiments, a user may receive a ranking that ranks a user's performance or nonperformance of the particular activity in comparison with the other competitors.

The disclosed embodiments and advantages thereof are best understood by referring to FIGS. 1-5 of the drawings, like numerals being used for like and corresponding parts of the various drawings. Other features and advantages of the disclosed embodiments will be or will become apparent to one of ordinary skill in the art upon examination of the following figures and detailed description. It is intended that all such additional features and advantages be included within the scope of the disclosed embodiments. Further, the illustrated figures are only exemplary and not intended to assert or imply any limitation with regard to the environment, architecture, design, or process in which different embodiments may be implemented.

Figure 1:
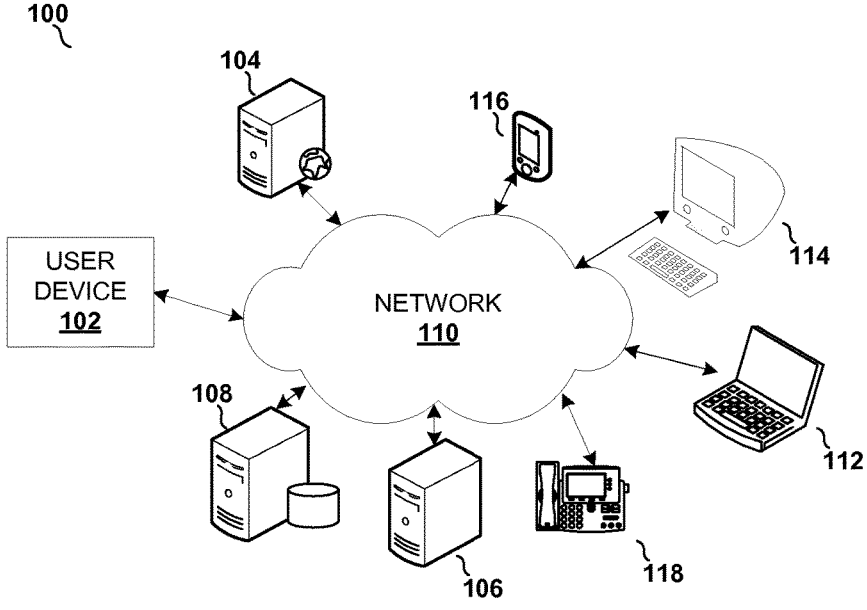
FIG. 1 is a schematic diagram illustrating a network environment in accordance with an embodiment of the invention.

FIG. 1 depicts an embodiment of a network environment 100 in which certain illustrative embodiments may be implemented. The network environment 100 includes a network 110 that enables a plurality of devices including a user device 102 to communicate data with other devices connected to the network 110. The network 110 may be any type of network including a wide area network, a local area network, one or more private networks, and the Internet. In some embodiments, network 110 may include a telephone network such as the public switched telephone network (PSTN) and a wireless data network such as, but not limited to, a 3G/4G network. The network 110 may include a plurality of network nodes (not depicted) such as routers, network access points/gateways, DNS servers, proxy servers, and other network nodes for assisting in routing of data between devices. The network 110 may provide data communications to any type of device including, but not limited to, a telephone 118, a laptop computer 112, a desktop computer 114, or a handheld mobile device 116. For example, the network 110 may contain Web servers 104, database servers 108, and other type servers 106 such as an e-mail server. The Web servers 104 host websites that provide content and other services to a user. For example, the Web servers 104 may host social networking websites such as Facebook®, MySpace®, and Twitter®. Additionally, in some embodiments, the Web servers 104 or servers 106 may provide financial services features such as, but not limited to, monitoring and categorizing spending associated with a user's financial account. As will be further discussed, the Web servers 104 and servers 106 may communicate data and perform other features associated with the disclosed embodiments.

The disclosed embodiments may be implemented in the user device 102. The user device 102 may be any type of electronic device including a laptop, PC, a mobile phone, are personal digital assistant (PDA). For example, in one embodiment, the user device 102 may be a BlackBerry® smart phone, an iPhone®, a Palm Pre®, a Windows® Mobile phone, or an Android® phone. In a preferred embodiment, the user device 102 may communicate with the network 110 wirelessly (e.g., using 3G or 4G, or through wireless hotspots) for sending and receiving data. In some embodiments, the user device 102 may also communicate with the network 110 using a wired connection.

Figure 2:
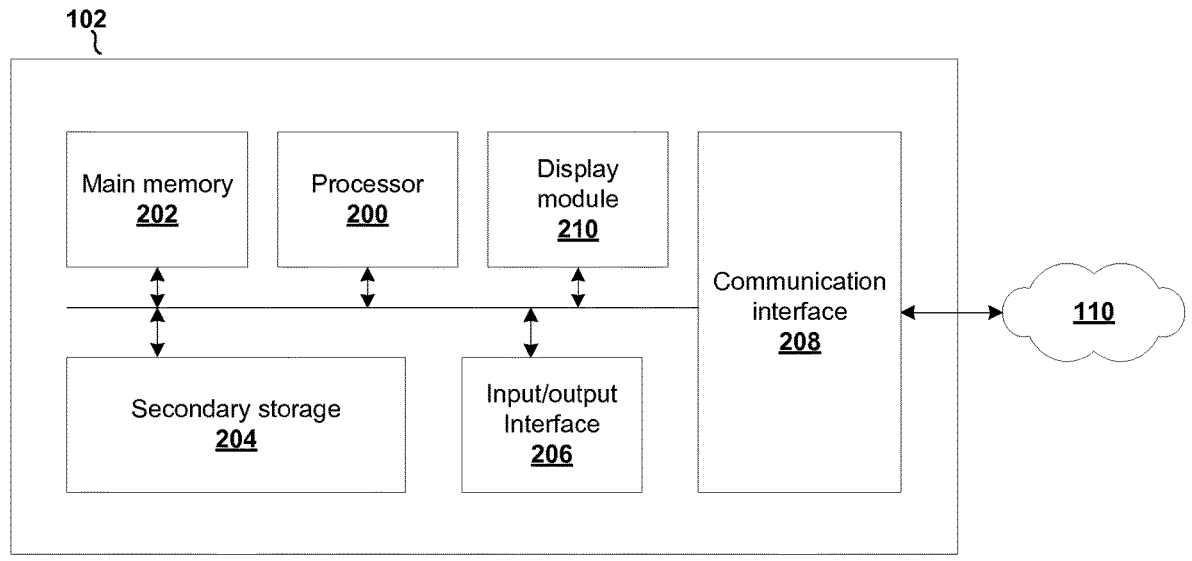
FIG. 2 is a schematic diagram illustrating a device in accordance with an embodiment of the invention.

FIG. 2 depicts a schematic diagram illustrating some components of the user device 102 in accordance with one embodiment. The user device 102 includes a processor 200, main memory 202, secondary storage unit 204, an input/output interface module 206, a communication interface module 208, and a display module 210. The processor 200 may be any type of processor capable of executing instructions for performing functions associated with the user device 102 and the features associated with the claimed embodiments.

Main memory 202 is volatile memory that stores currently executing instructions/data, or instructions/data that are prefetched for execution. The secondary storage unit 204 is non-volatile memory for storing persistent data. The secondary storage unit 204 may be or include any type of data storage component such as a hard drive, a flash drive, or memory card.

The input/output interface module 206 enables the user device 102 to receive user input and output information to a user or other devices. For example, the input/output interface module 206 may include a keyboard interface for receiving keyboard inputs from a user. The input/output interface module 206 may also include a mouse/trackball interface for enabling a user to position a pointer on a user interface for selecting or entering data. In some embodiments, the input/output interface module 206 also provides audio and video capabilities. For instance, the input/output interface module 206 may interface with an internal or external camera for providing videoconferencing. The input/output interface module 206 may also enable external devices such as printers, USB flash drive, speakers, to be connected to the user device 102.

The communication interface module 208 enables the user device 102 to communicate with the network 110. For example, the network interface module 208 may include a network interface card for hardwiring the user device 102 to the network 110. In a preferred embodiment, the communication interface module 208 includes a wireless data interface for enabling the user device 102 to communicate wirelessly through a wireless access point or via a wireless network with the network 110. In addition, the communication interface module 208 may also include a radiofrequency transceiver for sending and receiving cellular signals for voice communications.

The display module 210 enables information to be displayed on an internal or external display device. In some embodiments, the display module 210 may include instructions or hardware for providing touchscreen capabilities for receiving user input via the display device. In certain embodiments, the display module 210 may also enable multi-touch functionalities associated with the display device.

Figure 3:
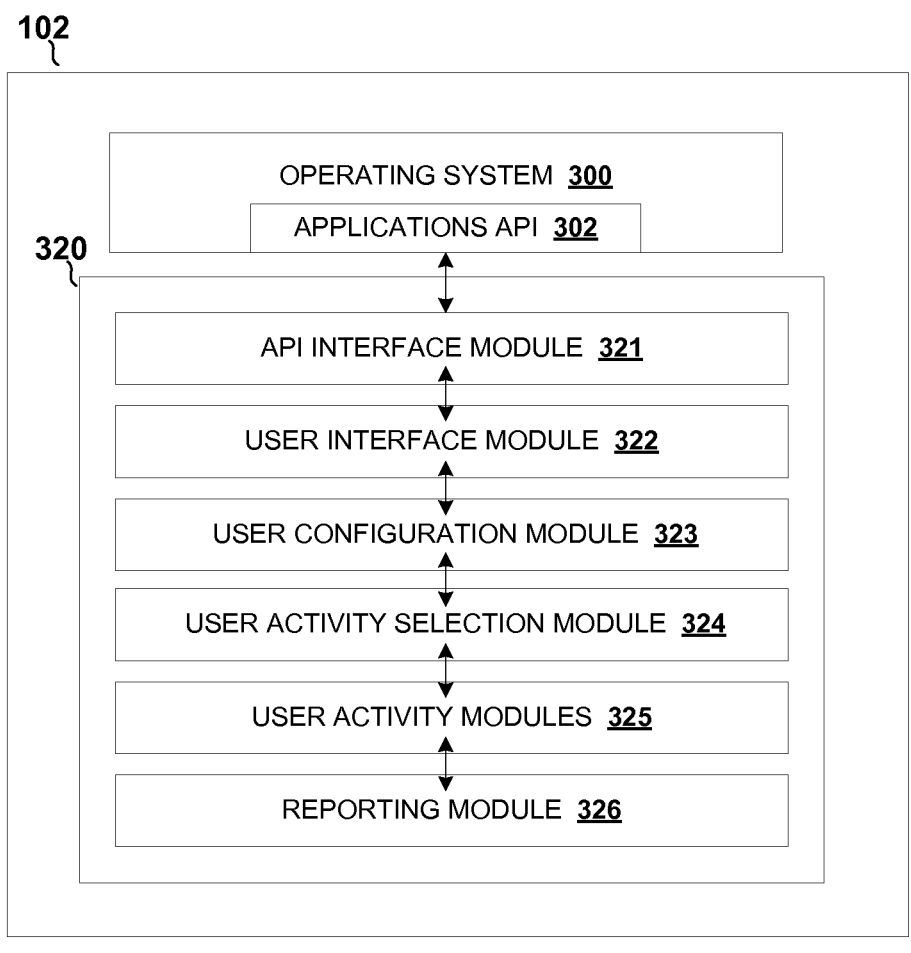
FIG. 3 is a schematic diagram illustrating components of an application in accordance with an embodiment of the invention.

With reference now to FIG. 3, a schematic diagram illustrating components of a software application 320 in accordance with an embodiment of the invention is presented. The software application 320 communicates with an operating system 300 installed on the user device 102. The software application 320 may be written in any suitable programming language for the user device 102. The operating system 300 provides instructions for enabling the components of the user device 102 to properly interact. In one embodiment, the operating system 300 includes an applications Application Programming Interface (API) 302 for enabling the operating system 300 to interact with other software, such as, but not limited to, the software application 320.

In the depicted embodiment, the software application 320 includes an API interface module 321, a user interface module 322, a user configuration module 323, a user selection module 324, user activity modules 325, and a reporting module 326. As referenced herein a module refers to a grouping of code, hardware, or some combination thereof, that are operable to perform particular tasks associated with the disclosed embodiments. For example, the API interface module 321 of the software application 320 includes instructions and data for interfacing with the applications API 302 of the operating system 300.

The user interface module 322 includes instructions and data that when executed by the processor 200 provides a graphical user interface for displaying and receiving data to/from a user. The user interface module 322 may also include instructions for receiving user input via touchscreen display device. In addition, in certain embodiments, the user interface module 322 may include instructions for rotating a user interface based on the orientation of a display device.

The user configuration module 323 includes instructions and data for enabling a user to configure user preferences associated with the disclosed embodiments. For example, in some embodiments, a user may create a user profile for generating a list of user activities generally associated with criteria identified in the user profile. In some embodiments, the user configuration module 323 may enable the user to set a predetermined goal/limit associated with a particular user activity or have a predetermined goal/limit automatically generated by the software application 320. The automatically generated predetermined goal/limit may be based on a user selection of a particular level, e.g., hard, medium, easy. In one embodiment, the user configuration module 323 may also enable a user to configure messages that appear to either encourage or discourage the user from performing a user selected activity. A user may also configure a message that is displayed if the goal/limit is reached. For example, the message may contain a task that the user must reform if a limit is reached for a particular user activity.

In certain embodiments, the user configuration module 323 may also enable a user to configure the software application 320 to import and export monitored information associated with a selected user activity from/to one or more people via the network 110. For example, in one embodiment, a user may link up a user's Facebook® account with a selected user activity for importing and exporting monitored data associated with the selected user activity (or for all user activities) for posting the monitored data on the user's Facebook® wall and/or for sending the monitored data to a group of Facebook® friends that are also utilizing the software application 320. In one embodiment, the user configuration module 323 may enable a user to set a user preference to display a ranking that compares the user's performance/nonperformance associated with a selected user activity to that of other users. Alternatively, or in addition to, the user configuration module 323 may include a user preference for sending and receiving text message or e-mails (i.e., notifications) with regard to updated status information associated with the selected user activity. Further, in some embodiments, a user may configure a user's financial account information with the software application 320 for importing and/or exporting financial information associated with one or more user-selected activities. For example, in one embodiment, a financial service provider may monitor and categorize transactions associated with a user's financial account and automatically transmit that information to a user's device. The user's device may automatically update, store, and/or simply display the financial data associated with one or more user-selected activities for enabling users to easily manage and track their financial transactions.

The user activity selection module 324 includes executable instructions for displaying a list of user activities that may be self monitored by a user. In some embodiments, the lists may be a textual lists containing selectable user activities. In other embodiments, the user selection module 324 may include instructions for presenting a graphical depiction of available user selectable activities such as the example illustrated in FIG. 48. The list of selectable user activities may include, but are not limited to, a particular good or service (e.g., shoes, purses, clothes, taxis, video games, beer, soda, coffee, cigarettes, Red Bull®, sweets, etc.) or an activity such as exercise, watching television, and hours spent surfing the Internet. In some embodiments, a user may define his/her own user activity that he or she wishes to monitor.

The user activity modules 325 include instructions for monitoring a user selected activity. For example, in response to receiving a user input selecting a particular user activity, the user activity modules 325 executes the appropriate user activity monitoring code associated with the selected user activity. In one embodiment, the user activity modules 325 is responsible for updating a user status based on a received user input indicating performance of the selected user activity. For certain user activities, the user activity modules 325 may also requests additional information associated with the indicated performance of a particular activity from a user. For example, if the user activity is shopping, the user activity modules 325 may request an amount spent and/or a number or type of items purchased. In these embodiments, the user activity modules 325 may store and calculate a total amount spent/cumulative costs or the number of items purchased for a given period, and display this information on the user interface. The costs may be an actual amount spent or the user activity modules 325 could use a set/average amount (e.g., $5 for every alcoholic drink) for calculating the costs associated with an occurrence of a user-selected activity. In some embodiments, the user activity modules 325 may calculate and display a difference value between the predetermined goal and the cumulative cost for the predetermined period. In addition, in some embodiments, the user activity modules 325 may calculate and display a savings value at the end of the predetermined period indicating the difference value between the predetermined goal and the cumulative cost for the predetermined period (e.g., an amount saved within a given month for smoking 12 fewer cigarettes than a predetermined goal such as, but not limited to, the number of cigarettes smoked last month).

The reporting module 326 includes instructions responsible for communicating, if set by a user, the user's activity status over the network 110 to one or more people. This may include, but is not limited to, communicating the user's status to social networking site for posting on the social networking site (e.g., Facebook® and Twitter®) and/or for communicating the updated status information to a group of friends designated by the user's social networking account. In some embodiments, the reporting module 326 may e-mail or text message the updated status to one or more people designated by a user. In addition, the reporting module 326 may include instructions responsible for receiving updated user status information from other users and updating and displaying the received information. In certain embodiments, if group reporting is enabled, a user may transmit messages to other users or a particular user (e.g., to encourage or discourage a user from performing a particular activity) that is displayed when the receiving user selects the particular activity for monitoring.

Still, in some embodiments, the reporting module 326 may include instructions for automatically transferring a dollar amount equaling a savings value, as discussed above, to a financial account of the user. For example, in certain embodiments, the user may configure a user's checking and savings account information (or other account information) and have the savings value automatically transferred from the user's checking account to the user's savings account (or any other type of financial transfer between any accounts). Alternatively, in some embodiments, the reporting module 326 may display a user interface asking the user whether the user would like to transfer all or a portion of the savings value to an account of the user. The reporting module 326 would then transfer an amount indicated by the user to the financial account indicated/configured by the user. Further, in certain embodiments, the reporting module 326 may include instructions for maintaining a cumulative amount of savings transferred to a financial account of the user that is associated with a particular user-activity type performed by the user (i.e., total savings of X amount for the past X number of months for a particular user-activity type). In some embodiments, the cumulative amount of savings transferred to a financial account of the user that is associated with a particular user-activity type performed by the user may be saved on a remote network device such as, but not limited to, a server of a financial service provider. The information may then be accessed remotely by the user over the network 110.

The above example modules of the software application 320 is intended to assist in explaining certain features of the claimed invention, and is not intended to limit the claimed invention to a particular design or implementation. For example, the features of each of the modules described above may be performed by a different module, a combination of other modules, or may be performed by other modules imported from a software library.

Figures 4A, 4B, 4C:
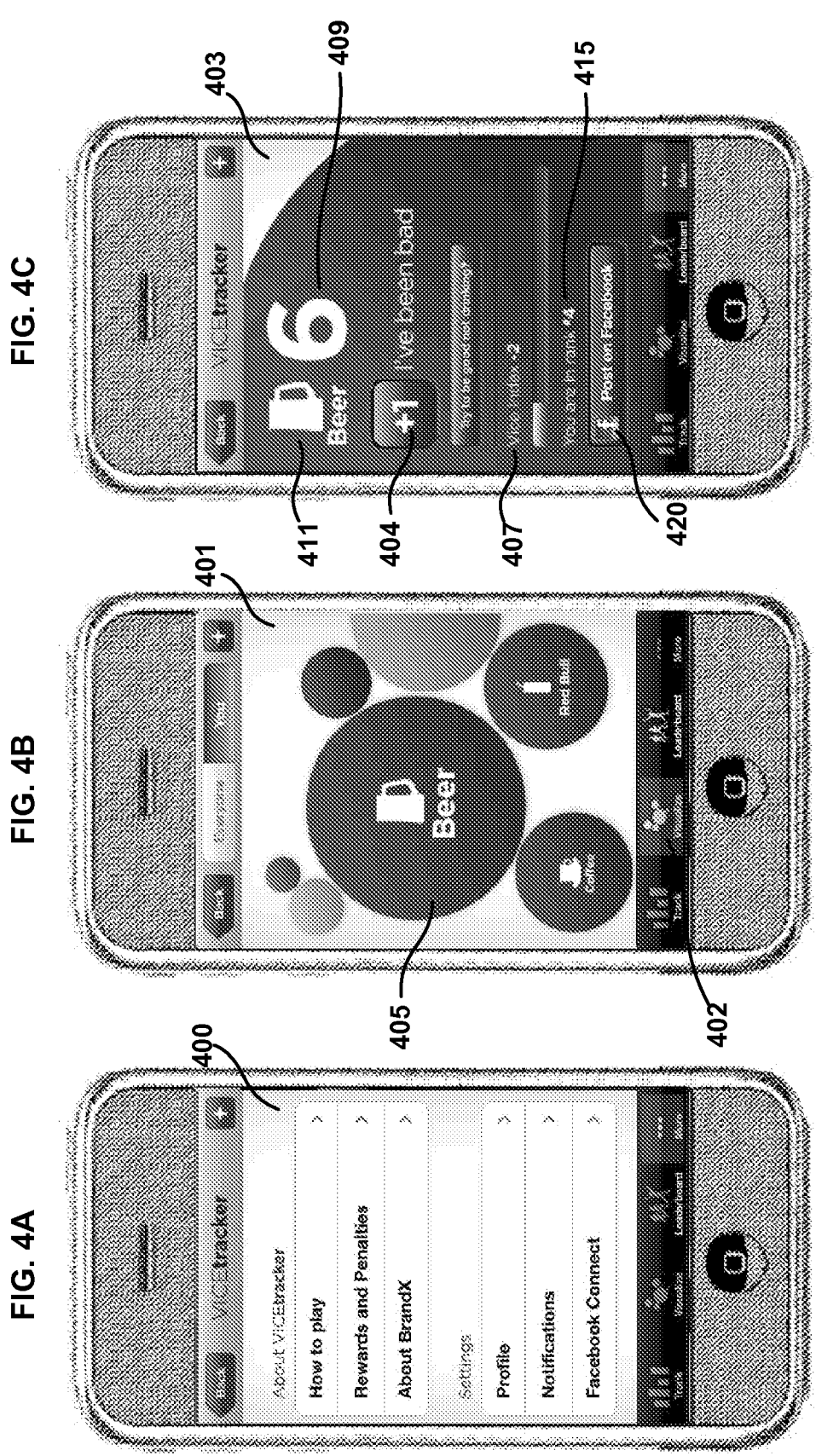
FIGS. 4A-4F illustrates several screenshots of the application disclosed in FIG. 3 in accordance with an embodiment of the invention.

With reference now to FIGS. 4A-4F, several examples of screenshots are illustrated in accordance with one embodiment of the invention. FIG. 4A illustrates an example user interface 400 that enables a user to configure user preferences associated with the software application 320. In one embodiment, a user is able to receive instructions on how to play/use the functions and features associated with the software application 320. In certain embodiments, a user may specify rewards and penalties associated with one or more user activities. The rewards and penalties may be different for each user activity. In addition, the user may configure a user profile, notifications, and social networking reporting parameters using the user interface 400.

FIG. 48 illustrates an example user interface 401 depicting a user activity selection screen that enables a user to select a user activity by touching a circle 405 containing a user activity. Alternatively, in some embodiments, a visualize button 402 may toggle the user selection activity screen from the graphical depiction illustrated in FIG. 48 to a textual list containing a list of selectable user activities (not depicted).

FIG. 4C illustrates an example user interface 403 depicting a user monitoring screen that enables a user to indicate the performance of a particular user activity 411. For example, a plus one button 404 may be used to indicate performance of the particular user activity. User interface 403 may include a vice index 407 that indicates an amount available before a goal/limit is reached. For example, in the depicted example, the user has a limit of 8 beers for a given time period (e.g., a night, a week, a month, etc.), therefore, the vice index 407 indicates that the user has a vice index of 2 because a user current status 409 indicates that the user has already had 6 beers for the given time period. In certain embodiments, the given time period may be user specified. In addition, the user interface 403 may include a ranking 415 that indicates the user's rank in comparison with other users (e.g., Facebook® friend). Alternatively, in some embodiments, the ranking 415 may be in comparison with other random anonymous users. Additionally, user interface 403 may include a post to social networking website button 420 for sending the monitored information to a user's social networking account or friends.

FIG. 40 illustrates an example user interface 430 that depicts a message 432 indicating that the user has reached his limit for an activity 431. The message 432 may include an option for a user to see his or her penalty. The penalty may be group designated or may be user specified. In some embodiments, the penalty may be randomly generated and/ or unknown until the limit is reached. For example, the penalty may be that the losing participant in the group buy or prepare lunch for the other participants.

Figures 4D, 4E, 4F:
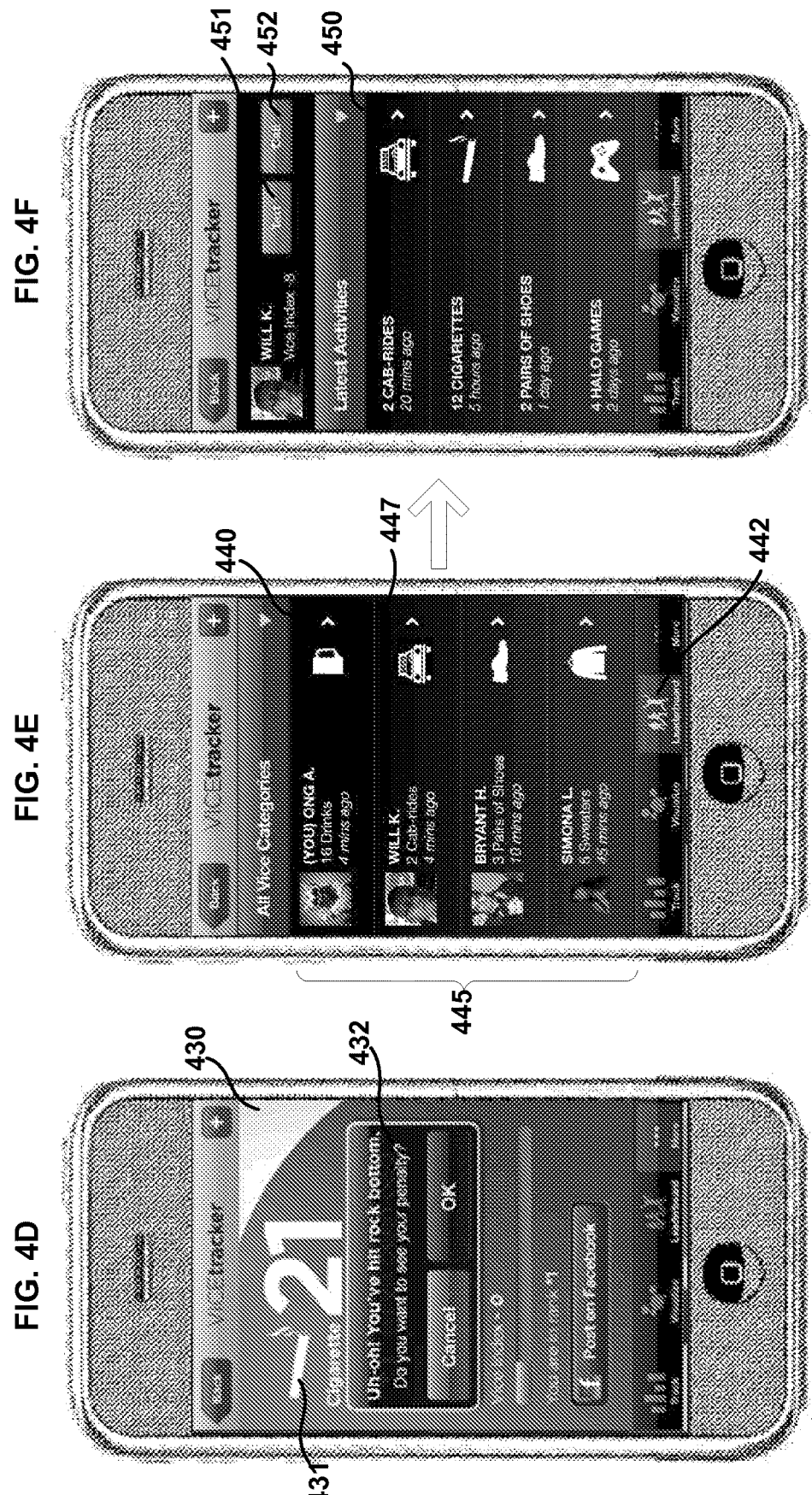

FIG. 4E illustrates an example user interface 440 that is displayed in response to a user selection of a display leader board option button 442. In one embodiment, the user interface 440 displays a list 445 of the leaders in each of the user activities a user participates. In other embodiments, the list 445 may display the leaders in every category even if the user does not participate in a particular user activity. In one embodiment, the list may identify a particular user activity, the leader of the particular user activity, the number of times the leader performed the particular user activity, and the last time the activity was performed by the leader.

In some embodiments, a user can select a particular leader, such as leader 447, to display other activities being monitored by the particular leader as illustrated in a user interface 450 depicted in FIG. 4F. In one embodiment, the user interface 450 includes a call option 452 for enabling a user to call the leader 447, and a text message option 451 for enabling the user to text message the leader 447.

Figure 5:
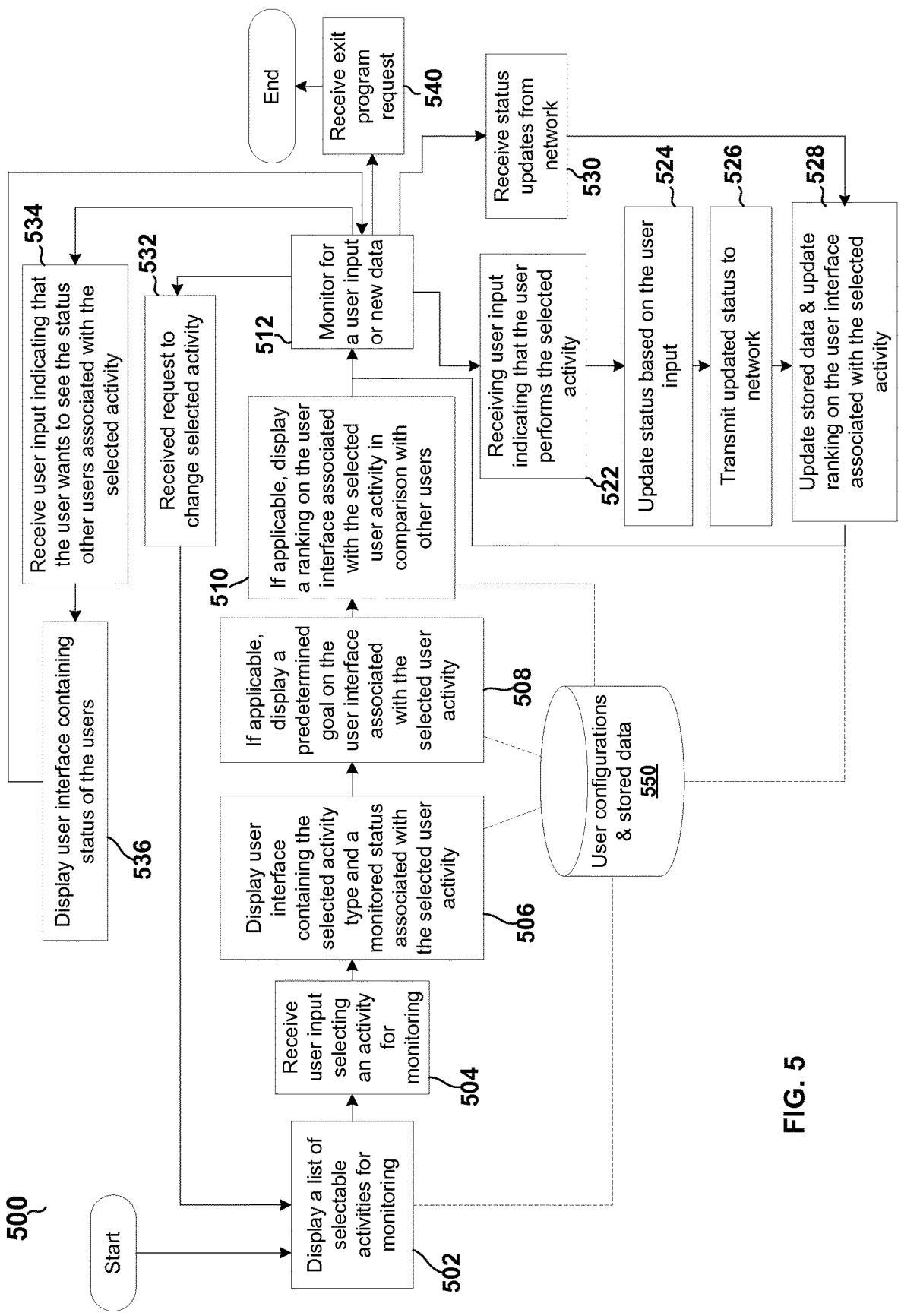
FIG. 5 is a flowchart illustrating a process for self monitoring one or more user activities and for sharing the monitored information in accordance with one embodiment.

With reference now to FIG. 5, a flowchart illustrating a process 500 for self monitoring one or more user activities and for sharing the monitored information in accordance with one embodiment is presented. The process 500 may be executed by the processor 200 of the user device 102. The user device 102 may be part of an ad hoc network comprising of multiple user devices that communicate information to each other without the use of a central server. Information and calculations may be stored and performed by each individual user device as illustrated in FIG. 5. Alternatively, in some embodiments, the user device 102 may communicate data with a central server. The central server may store the data and may also perform one or more functions associated with the received data. For example, in one embodiment, the central server may calculate rankings for a plurality of users associated with a particular activity. The central server may transmit individual rankings to each user's device or may transmit all rankings to each user's device.

In the depicted embodiment illustrated in FIG. 5, the process 500 begins at step 502 by displaying a list of selectable user activities for enabling a user to self monitor the user's habits. At step 504, the process receives a user input selecting an activity for monitoring. The process displays a user interface containing the selected activity type and a status associated with the selected user activity at step 506. The status for the particular activity may be retrieved from a data storage unit 550 that stores the user configurations and other related data associated with the software application 320. If the user preferences indicate a goal or an automatic goal is generated, the process displays the predetermined goal on the user interface associated with the selected user activity at step 508. If the user preferences indicate that the user shares information associated with the user selected activity with one or more persons, the process, at step 510, displays a ranking on the user interface that compares the user to the other users. At step 512, the process monitors for user input or for new data from the network 110.

If the process, at step 522, receives user input indicating that the user performed the selected activity, the process updates the user status at step 524. At step 526, the process, if applicable, transmits the updated status over the network 110 to one or more persons participating in the user selected activity. The process updates the stored data and updates the ranking, if applicable, on the user interface associated with the selected user activity. The process returns to step 512 and waits for a user input or for new data from the network 110.

If the process receives at step 530 new data from the network 110 indicating a status update of a participant of a user selected activity, the process updates the stored data and updates a ranking associated with the user selected activity in the data storage unit 550. If the process at step 532 receives a request to change from the selected user activity to another user activity, the process returns to step 502 and displays the list of selectable user activities.

If the process receives, at step 534, a user input indicating that the user wants to see the status of other users associated with the selected activity, the process, at step 536, displays a user interface containing the status of the other users. The process exits the program if an exit requests is received at step 540, with the process 500 terminating thereafter.

Accordingly, the above disclosure describes a novel and inventive system and method for self-monitoring one or more user activities and for sharing the monitored information associated with others. The illustrative embodiments can take the form of an entirely hardware embodiment, an entirely software embodiment or an embodiment containing both hardware and software elements. Furthermore, the illustrative embodiments can take the form of a computer program product accessible from a computer-usable or computer-readable medium providing program code for use by or in connection with a computer or any instruction execution system. For the purposes of this description, a computer-usable or computer-readable medium can be any tangible apparatus that can contain, store, communicate, or transport the program for use by or in connection with the instruction execution system, apparatus, or device.

The previous detailed description is of a small number of embodiments for implementing the invention and is not intended to be limiting in scope. The following claims set forth the scope of the invention.

What is claimed is:

1. A method comprising:
displaying, by a display and via a network, a graphical user interface comprising one or more activities performable by a user of a user device and statuses of the one or more activities;
receiving, by at least one processor and via the graphical user interface, a user-selected activity of the one or more activities performable by the user of the user device;
requesting, by the at least one processor, the user to provide additional information based on the user-selected activity;
receiving, by the at least one processor and via the graphical user interface, the additional information;
modifying, by the at least one processor, the graphical user interface to include one or more updated statuses of the one or more activities based on the user-selected activity and on the additional information;
displaying, by the display, the graphical user interface with the one or more updated statuses of the one or more activities based on the user-selected activity and the additional information;
importing, by the at least one processor and from a social networking application via the network, social networking data indicating performance or non-performance of a user-selected activity type;
generating, by the at least one processor, user activity data based at least in part on the social networking data, wherein the user activity data corresponds to the performance or non-performance of the user-selected activity type;
determining, by the at least one processor and based on the user activity data, a financial cost associated with performance or non-performance of the user-selected activity type; and responsive to determining that an activity goal has been met:

automatically transferring a dollar amount associated with the financial cost from a first financial account associated with the user to a second financial account.

2. The method of claim 1 further comprising:
importing, by the at least one processor and via the network, user financial data from one or more external financial service provider systems, wherein generating the user activity data is further based at least in part on the user financial data.

3. The method of claim 1 further comprising:
determining, by the at least one processor, a cumulative amount of savings achieved by one or more automatic transfers; and
outputting for display the cumulative amount of savings achieved by the one or more automatic transfers.

4. The method of claim 1 further comprising:
automatically generating, by the at least one processor, the activity goal based on the user-selected activity type and an activity limit based on the user-selected activity type.

5. The method of claim 4 further comprising:
responsive to determining that the activity limit has been exceeded:
providing a penalty to the user.

6. The method of claim 1, wherein the dollar amount is a savings dollar amount and the activity goal is greater than a cumulative cost for a predetermined period.

7. The method of claim 6 further comprising:
receiving, at the at least one processor, a user-determined percentage and a user-selected account, wherein the user-selected account indicates a financial account able to receive a transfer of funds, and wherein the user-determined percentage indicates a percentage of the savings dollar amount to transfer to the user-selected account;
wherein the transferring of the savings dollar amount comprises transferring the user-determined percentage of the savings dollar amount to the user-selected account.

8. The method of claim 7 further comprising:
determining, by the at least one processor, a cumulative savings dollar amount for each user-selected account; and
transmitting, by an input/output device in communication with the at least one processor, the cumulative savings dollar amount to a user device.

9. The method of claim 1, wherein the activity goal is avoidance of the user-selected activity type.

10. The method of claim 1, wherein the activity goal is engaging in the user-selected activity type.

11. A method comprising:
displaying, by a display and via a network, a graphical user interface comprising one or more activities performable by a user of a user device and statuses of the one or more activities;
receiving, by at least one processor and via the graphical user interface, a user-selected activity of the one or more activities performable by the user of the user device;
requesting, by the at least one processor, the user to provide additional information based on the user-selected activity;
modifying, by the at least one processor, the graphical user interface to include one or more updated statuses of the one or more activities based on the user-selected activity and on the additional information;

displaying, by the display, the graphical user interface with the one or more updated statuses of the one or more activities based on the user-selected activity and the additional information;

receiving, by the at least one processor and from the user device, a user input indicating performance or non-performance of a user-selected activity type;

iteratively monitoring the user device for any changes to the user input;

generating, by the at least one processor, user activity data based at least in part on the user input and the changes to the user input, wherein the user activity data corresponds to the performance or non-performance of the user-selected activity type;

determining, by the at least one processor and based on the user activity data, a financial cost associated with performance or non-performance of the user-selected activity type; and responsive to determining that an activity goal has been met:

automatically transferring a dollar amount associated with the financial cost from a financial account associated with the user to a second financial account.

12. The method of claim 11 further comprising:

importing, by the at least one processor and via the network, user financial data from one or more external financial service provider systems, wherein generating the user activity data is further based at least in part on the user financial data.

13. The method of claim 11 further comprising:

determining, by the at least one processor, a cumulative amount of savings achieved by one or more automatic transfers; and outputting for display the cumulative amount of savings achieved by the one or more automatic transfers.

14. The method of claim 11 further comprising:

generating, by the at least one processor, the activity goal based on the user-selected activity type and an activity limit based on the user-selected activity type.

15. The method of claim 14 further comprising:

responsive to determining that the activity limit has been exceeded:

providing a penalty to the user.

16. The method of claim 11, wherein the dollar amount is a savings dollar amount and the activity goal is greater than a cumulative cost for a predetermined period.

17. The method of claim 16 further comprising:

receiving, at the at least one processor and via the network, a user-determined percentage and a user-selected account, wherein the user-selected account indicates a financial account able to receive a transfer of funds, and wherein the user-determined percentage indicates a percentage of the savings dollar amount to transfer to the user-selected account; wherein the transferring of the savings dollar amount comprises transferring the user-determined percentage of the savings dollar amount to the user-selected account.

18. The method of claim 17 further comprising:

determining, by the at least one processor, a cumulative savings dollar amount for each user-selected account; and transmitting, by an input/output device in communication with the at least one processor, the cumulative savings dollar amount to a user device.

19. The method of claim 1, wherein the social networking data indicates performance or non-performance of the user-selected activity type by the user and one or more second users, the method further comprising:

iteratively determining a ranking of the user and the one or more second users based on the user activity data; and dynamically modifying a second graphical user interface (GUI) based on the ranking to generate a modified GUI; and causing the user device to display the ranking via the first graphical user interface modified GUI.

20. The method of claim 4, wherein generating the user activity data comprises automatically generating the user activity data.

* * * * *